(12) United States Patent
Matzdorf et al.

(10) Patent No.: US 10,662,338 B2
(45) Date of Patent: May 26, 2020

(54) PASSIVE COATINGS FOR BULK ALUMINUM AND POWDER PIGMENTS

(71) Applicants: Craig Matzdorf, Hollywood, MD (US); Joshua Walles, California, MD (US); Kaitlyn Thompson, San Diego, CA (US)

(72) Inventors: Craig Matzdorf, Hollywood, MD (US); Joshua Walles, California, MD (US); Kaitlyn Thompson, San Diego, CA (US)

(73) Assignee: The United States of America as represented by the secretary of the Navy, Washington, DC (US)

( * ) Notice: Subject to any disclaimer, the term of this patent is extended or adjusted under 35 U.S.C. 154(b) by 0 days.

(21) Appl. No.: 16/123,605

(22) Filed: Sep. 6, 2018

(65) Prior Publication Data

US 2020/0079963 A1    Mar. 12, 2020

(51) Int. Cl.
*C09D 5/08* (2006.01)
*C23C 22/83* (2006.01)
*C23C 24/10* (2006.01)
*C23C 22/34* (2006.01)

(52) U.S. Cl.
CPC ............. *C09D 5/084* (2013.01); *C23C 22/34* (2013.01); *C23C 22/83* (2013.01); *C23C 24/10* (2013.01); *C23C 2222/10* (2013.01)

(58) Field of Classification Search
CPC ......... C09D 5/084; C23C 22/34; C23C 22/83; C23C 24/10; C23C 2222/10
See application file for complete search history.

(56) References Cited

U.S. PATENT DOCUMENTS

| | | |
|---|---|---|
| 5,336,303 A | 8/1994 | Cocks |
| 6,375,726 B1* | 4/2002 | Matzdorf ............... C09D 5/084 106/14.21 |
| 6,511,532 B2* | 1/2003 | Matzdorf ............... C09D 5/084 106/14.21 |
| 6,521,029 B1 | 2/2003 | Matzdorf |
| 6,663,700 B1* | 12/2003 | Matzdorf ............... C09D 5/084 106/14.21 |
| 6,669,764 B1* | 12/2003 | Matzdorf ............... C09D 5/084 106/14.21 |
| 8,277,688 B2 | 10/2012 | Matzdorf |
| 9,243,150 B2 | 1/2016 | Matzdorf et al. |
| 2013/0168612 A1 | 7/2013 | Matzdorf et al. |
| 2014/0084221 A1 | 3/2014 | Matzdorf et al. |
| 2018/0216234 A1 | 8/2018 | Westre et al. |

* cited by examiner

*Primary Examiner* — Anthony J Green
(74) *Attorney, Agent, or Firm* — Mark O. Glut; NAWCAD

(57) ABSTRACT

Composition and process for preparing corrosion-resistant passive coatings on bulk-aluminum alloys and aluminum powder-pigments; said coatings derived from an acidic aqueous composition consisting essentially of potassium hexafluorozirconate, basic chromium sulfate and potassium tetrafluoroborate.

4 Claims, 4 Drawing Sheets

PASSIVE COATINGS FOR BULK ALUMINUM AND POWDER PIGMENTS

STATEMENT OF GOVERNMENT INTEREST

The Invention described herein may be manufactured and used by or for the Government of the United States of America for governmental purposes without the payment of any royalties thereon or therefore.

FIELD OF THE INVENTION

This invention relates to sacrificial-metal pigments coated with effective amounts of corrosion inhibitors and combinations of said coated metal pigments with film-forming binders for application to metal substrates. The combination of coated pigments with film-forming polymeric binder results in an electrochemically active coating composition which provides cathodic protection to various metal substrates.

Metal surfaces require the protection of coatings especially when the surfaces are exposed to corrosive environments. Metal surfaces of aircraft, for example, are exposed to seawater which requires protection from corrosion. Specifically, aircraft, e.g., Navy aircraft, are exposed to seawater spray in addition to various acid-forming gases such as sulfur dioxide. In addition to aircraft, machinery and equipment in the industrial environments, where fossil fuels are used also needs protection against corrosion. It is important that the coating on the pigment be resistant to corrosion, including chemicals, the weather and at the same time be flexible and have good adhesion to the various metal substrates. More specifically, this invention relates to a composition and process to produce a passive coating on metal particles to control their reaction with the environment. For anodic metals, like aluminum and aluminum alloys, the coating acts to preserve the metal from self-corrosion before it can be useful to protect the more cathodic material, usually another metal, from corroding. For cathodic metals, like nickel, the coating acts to keep the nickel from reacting with the substrate it is on which is usually anodic to the nickel and would otherwise corrode. This is a serious problem with nickel, copper and silver-based coatings applied to aluminum.

Metal powder or pigments have extremely high surface area. For example, 100 grams, a relatively small amount, of 10 micrometer diameter aluminum powder (a typical size used in metal-rich primers) has approximately 22 square meters of surface area. One gallon of aluminum-rich primer uses approximately 3.2 kilograms of treated aluminum powder. This translates into approximately 700 square meters of surface area in a relatively small volume. A novel feature of this invention is the ability to treat high-surface area metal powders such as aluminum pigment with high concentration compositions to deposit effective passive coatings at a low cost.

BACKGROUND

Metallic pigments are known to provide electrochemical, thermal, and barrier properties to compositions which are used for protecting various metals from corrosion, maintaining electrical conductivity, shielding equipment from electromagnetic fields, resisting elevated temperatures, and providing protection from moisture. Silver, gold and other noble metal pigments are used for their electrical conductivity and thermal conductivity properties. Zinc and magnesium are used for their electrochemical properties. Aluminum is used for its thermal and chemical-barrier properties. A major shortcoming of the noble metals is their strong cathodic potential. When used in products for electrical and thermal management, the noble metals coupled with anodic materials such as aluminum alloys are used for electrical equipment.

Metals such as zinc and magnesium are used in cured coatings to provide corrosion resistance to the metal on which they are coated. Typical zinc-rich primers use zinc "dust" which is approximately 5 micron zinc powder. This zinc powder is added untreated to various resins, organic and inorganic materials. Zinc-rich coatings are used mostly on steel to slow down the onset of rust or corrosion. A common secondary problem with zinc-rich coatings is the rusting or corrosion of the zinc powder in the coating while it is protecting the steel. When zinc corrodes, it typically forms a white residue which can discolor the object being protected and is not desired for aesthetic reasons. This zinc self-corrosion also "uses up" the zinc and reduces the effective life of the zinc-rich coating.

Other metals, such as magnesium has been used in combination with zinc and by itself in similar coatings to protect steel and aluminum respectively. Magnesium also is prone to forming white corrosion products which discolor the object being protected and is undesirable for aesthetic reasons. A second application of coatings with metal pigments is for electrical and thermal conductivity. Silver, nickel, copper and aluminum are good conductors of electricity and heat. Silver and nickel are commonly used as pigments in conductive coatings on other materials like glass, carbon-graphite, and aluminum which are lighter and less expensive. Copper is an excellent bulk conductor but is not typically used as a conductive pigment as it oxidizes quickly and loses its ability to conduct electricity effectively in coatings. Aluminum is an excellent bulk conductor, but it also oxidizes easily in the natural environment and is not effective as a conductive pigment in coatings. A third application is the protection of iron alloy (steel) particles from rusting due to exposure to the environment. These particles are used in coatings for their magnetic properties and tend to red rust and lose effectiveness over time due to exposure to the environment.

It is therefore an object of this invention to incorporate electrochemically active coated-pigments into a binder to provide cathodic protection to metal substrates.

It is another object to provide cathodic protection to metal substrates by coating the substrates with a sacrificial-anode coating that keeps the electrochemical potential of the substrates negative to prevent its corrosion.

It is a further object of this invention to provide metal pigments containing effective amounts of a corrosion-resistant coating and the use of these coated pigments in film-forming binders as a coating for metal substrates.

DESCRIPTION OF DRAWINGS/FIGURES

DETAILED DESCRIPTION

Figure 1:
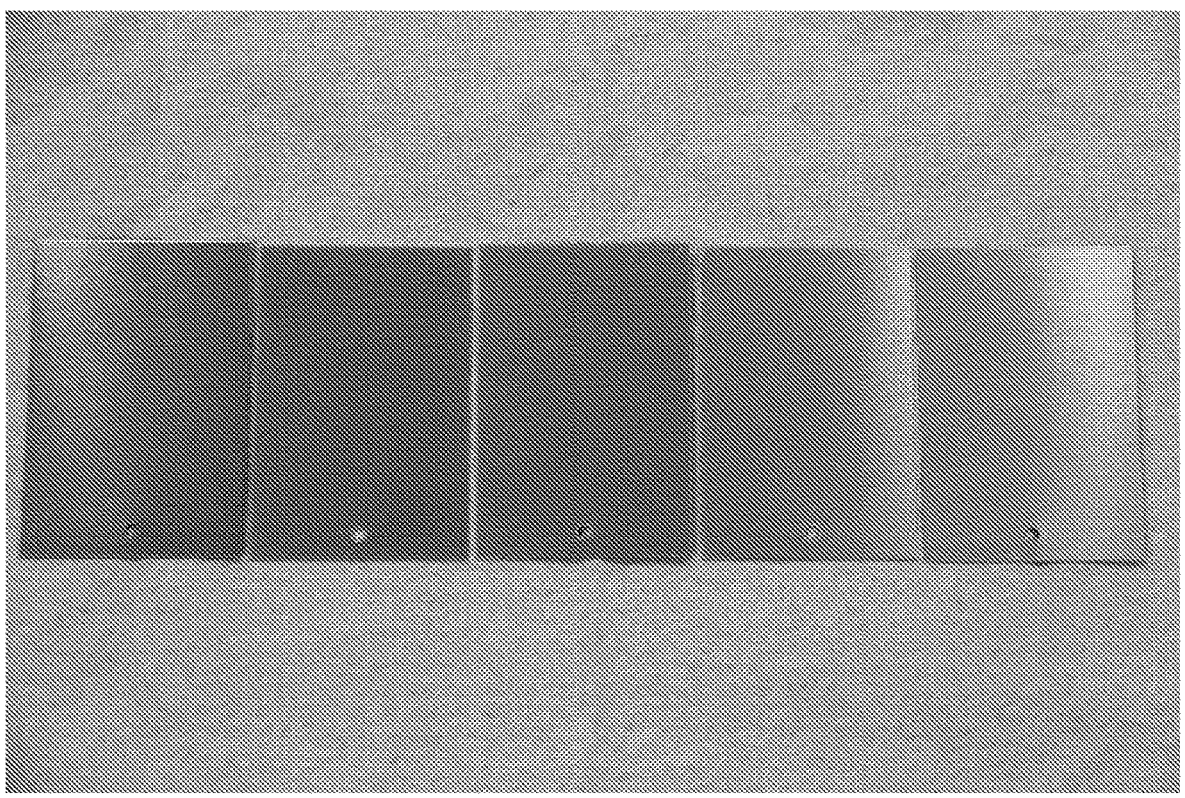
FIG. 1 shows 2014-T3 aluminum coated with, from left to right, Surtec 650 (control), Example 4 coating at 0.5 min, Example 4 coating at 1 min, Example 4 coating at 5 min and Example 4 coating at 8 min. Panels are shown after coating and before ASTM B117 neutral salt fog testing.

The invention relates to corrosion-inhibiting coated aluminum powder pigments and film-forming compositions for coating various metal substrates. More specifically, the invention relates to preparing passive coatings on bulk-aluminum alloys and more particularly on aluminum powder-pigments having a micro size ranging from about 1.0 to 200 microns. The coating is derived from a corrosion-resistant aqueous composition having a pH ranging from about 2.8-4.0 at temperatures ranging from about 120 F to 200 F degrees. The passive coating composition consists essentially of, in parts by weight per liter of water, from about 20 to 70 parts of potassium hexafluorozirconate, 15 to 92 parts of chromium sulfate (basic), and from 0.0 parts to about 1.5 parts of potassium tetrafluoroborate.

EXAMPLE 1

An acidic aqueous solution having a pH ranging from about 2.8 to 4.0 for treating aluminum and aluminum alloys in bulk and high-surface area powder ranging in size from about 1 micrometer (micron) in diameter to about 200 microns in diameter to form a corrosion-resistant coating thereon comprises, per liter of solution, from about 20 grams per liter to 70 grams per liter of potassium hexafluorozirconate, about 15 grams per liter to 92 grams per liter chromium sulfate basic, at a temperature from about 120 Fahrenheit to about 200 Fahrenheit.

EXAMPLE 2

An acidic aqueous solution having a pH ranging from about 2.8 to 4.0 for treating aluminum and aluminum alloys in bulk and high-surface area powder ranging in size from about 1 micrometer (micron) in diameter to about 200 microns in diameter to form a corrosion-resistant coating thereon comprises, per liter of solution, from about 20 grams per liter of potassium hexafluorozirconate, about 15 grams per liter chromium sulfate basic, and about 1 gram per liter potassium tetrafluoroborate at a temperature from about 120 Fahrenheit to about 200 Fahrenheit.

EXAMPLE 3

An acidic aqueous solution having a pH of 3.8 for treating aluminum and aluminum alloys in bulk and high-surface area powder ranging in size from about 1 micrometer (micron) in diameter to about 200 microns in diameter to form a corrosion-resistant coating thereon comprises, per liter of solution, from about 35 grams per liter of potassium hexafluorozirconate and about 46 grams per liter chromium sulfate basic, at a temperature from about 120 Fahrenheit to about 150 Fahrenheit.

EXAMPLE 4

Prior to forming the passive coating on bulk aluminum, the solution from Example 3 was mixed, with pH adjusted to 3.8 using potassium hydroxide after mixing, while temperature was held at 120 Fahrenheit. Before treating the 2024-T3 aluminum test coupons, the coupons were cleaned for 10 minutes in an alkaline phosphate cleaner at about 140 Fahrenheit, double rinsed in cold tap water, immersed in an acidic deoxidizer for 1 minute, and double rinsed in cold tap water. The treated 2024-T3 coupons were then immersed in the passivation solution for 30 seconds to 8 minutes, then removed and double rinsed in cold tap water with a final rinse in deionized water. Coupons were then allowed to air dry at ambient conditions.

EXAMPLE 5

A passive coating was applied to 2024-T3 aluminum panels per Example 4 and then coating weights obtained by weighing the coupons, stripping the coatings in 50% nitric acid, rinsing and drying and then re-weighing. Table 1 shows the coating weights for coatings formed from the new composition compared to the control, which is described in prior art (U.S. Pat. No. 6,521,029). As the data show, coatings from Example 4 are approximately 2 times heavier (thicker) for a given immersion time compared to the control.

TABLE 1

| Process | Temperature (F.) Fahrenheit | Time (minutes) | Coating weights (mg/ft$^2$) | | | Average Coating Weight |
|---|---|---|---|---|---|---|
| Control (Surtec 650) | 75 | 5 | 36.4 | 35.2 | 34.8 | 35.5 |
|  | 150 | 0.5 | 17.2 | 16.8 | 14.8 | 16.3 |
|  |  | 1 | 20.4 | 20.8 | 18.8 | 20.0 |
|  |  | 2 | 22.4 | 21.2 | 19.2 | 20.9 |
|  |  | 5 | 35.6 | 32.0 | 26.8 | 31.5 |
| Example 4 | 120 | 0.5 |  |  |  | 32.4 |
|  |  | 5 |  |  |  | 55.6 |

EXAMPLE 6

Figure 2:
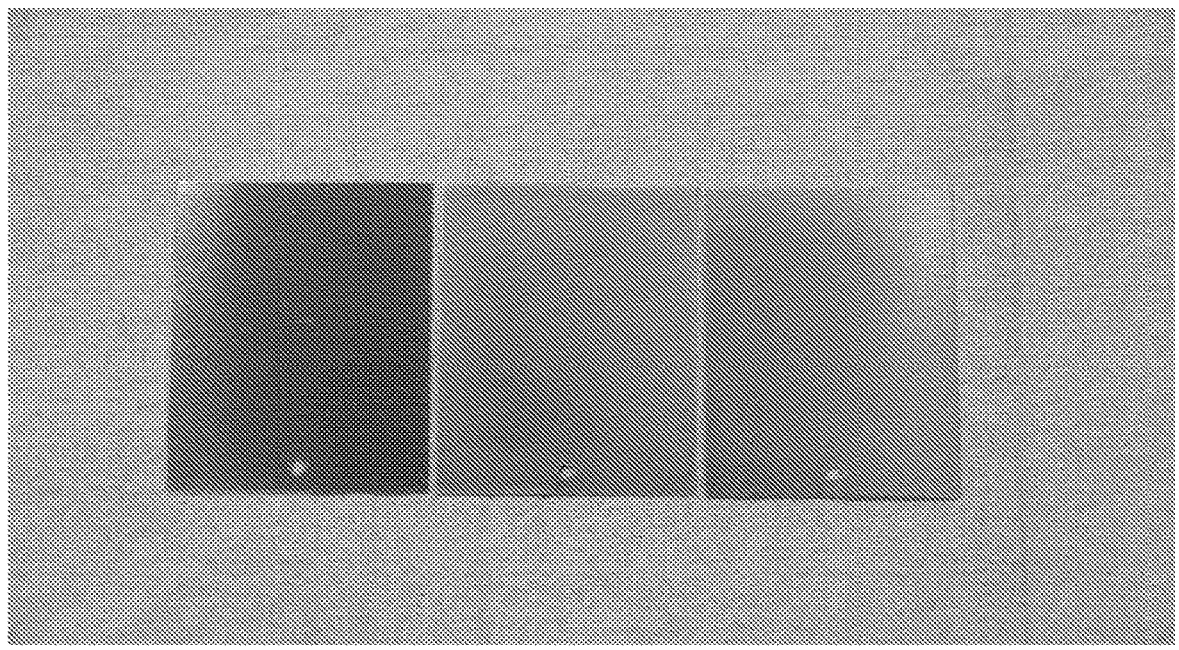
FIG. 2 shows from left to right, uncoated 2024-T3 aluminum, Example 4 coating at 5 min and Example 4 coating at 8 min. Panels are shown after coating.
Figure 3A:
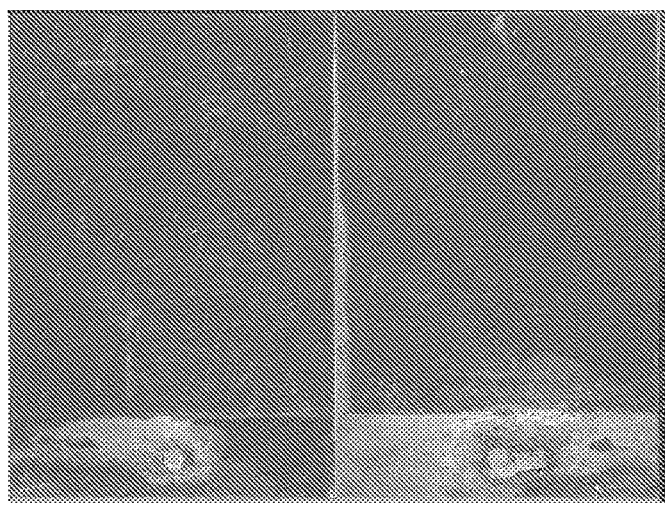
FIG. 3 shows 2024-T3 aluminum coated with, Surtec 650 (control) (3*a*), Example 4 coating at 0.5 min (3 B), Example 4 coating at 1 min (3*c*), Example 4 coating at 5 min (3*d*) and Example 4 coating at 8 min (3*e*). Panels are shown after 4 weeks ASTM B 117 neutral salt fog exposure.
Figure 3B:
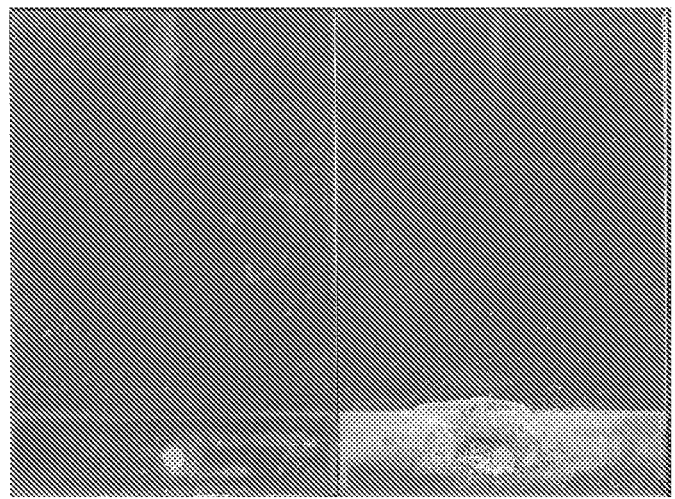
Figure 3C:
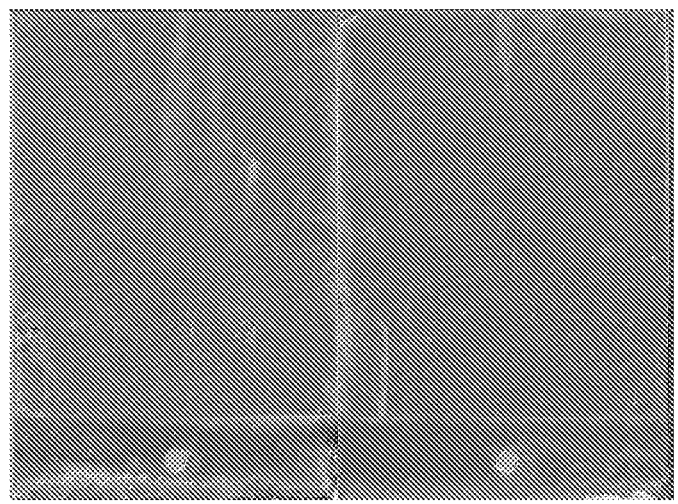
Figure 3D:
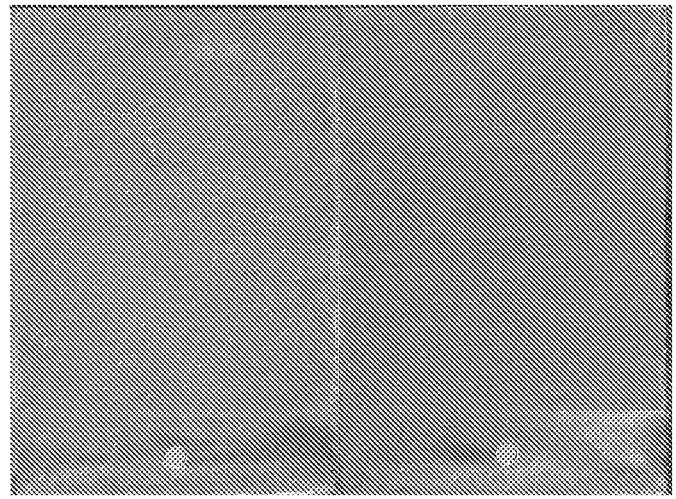
Figure 3E:
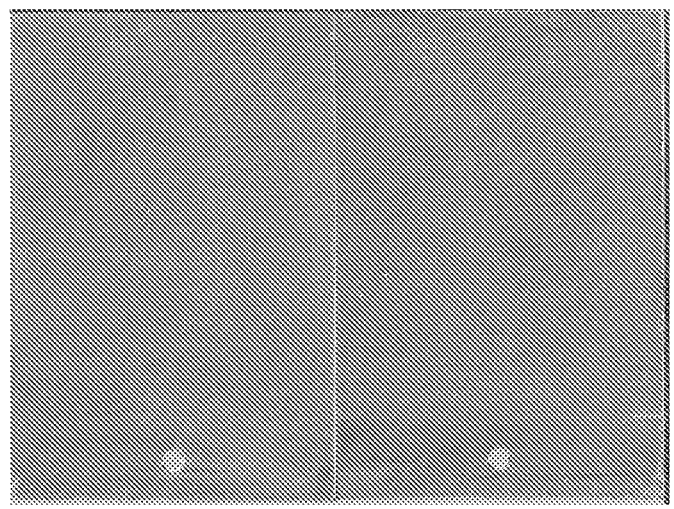

The corrosion performance of coatings made from the process described in Example 4 was determined by exposing the treated 2024-T3 panels to ASTM B117 neutral salt fog for 4 weeks. Test panels coated for 0.5, 1, 5 and 8 minutes were assessed. As shown in FIG. 1, the panels coated for 5 and 8 minutes have a significant different appearance or color tint than control. This is an important advantage for quality assurance that the control is lacking. This is even more evident in FIG. 2, which shows the 5 and 8 minute coatings compared to bare aluminum. FIG. 3 shows the same panels after 4 weeks of ASTM B117 neutral salt fog. It is clear that all the Example 4 coatings are outperforming the control, with the 8-minute panel especially high performing. This is also a key advantage over the control, where corrosion performance (resistance to pitting) is limited to about 2 weeks in ASTM B117 neutral salt fog.

The passive coatings on the aluminum pigments can be added to binders. The binders for the film-forming coatings are selected from the group consisting of inorganic binders such as siloxanes and the organic polymers such as polyurethanes, polyimides, polymers derived from epoxies, polymers derived from isocyanates, and the uncured prepolymers or monomers of said polymers. Also, the film-forming binders are selected from the group consisting of the inorganic polymers derived from silanes, siloxanes and silicones.

While this invention has been described by a number of specific examples, it is obvious that there are other variations and modifications which can be made without departing from the spirit and scope of the invention: as particularly set forth in the appended claims.

The invention claimed is:

1. Process for preparing passive coatings on bulk-aluminum alloys and aluminum-powder pigments having a micro size ranging from about 2.8 to 4.0 microns which comprises coating said aluminum alloys and powder-pigments with an acidic aqueous composition having a pH of about 3.8 at temperatures ranging from about 120° F. to 150° F.; said aqueous composition consisting essentially of from about, in parts by weight per liter of water, 35 grams per liter of potassium hexafluorozirconate, 46 grams per liter of basic chromium sulfate and from 0.0 to 1.5 grams per liter of potassium tetrafluoroborate.

2. Process for preparing passive coatings on bulk-aluminum alloys and aluminum-powder pigments having a micro size ranging from about 2.8 to 4.0 microns which comprises coating said aluminum alloys and powder-pigments with an acidic aqueous composition having a pH of about 2.8 to 4.0 and at temperatures ranging from about 120° F. to 200° F.; said aqueous composition consisting essentially of about, in parts by weight per liter of water, 20 grams per liter of potassium hexafluorozirconate, 15 grams per liter of basic chromium sulfate and 1.0 grams per liter of potassium tetrafluoroborate.

3. Process for preparing passive coatings on bulk-aluminum alloys and aluminum-powder pigments having a micro size ranging from about 2.8 to 4.0 microns which comprises coating said aluminum alloys and powder-pigments with an acidic aqueous composition having a pH from about 3.8 at temperatures ranging from about 120° F. to 200° F.; said aqueous compositions consisting essentially of about, in parts by weight per liter of water, 35 grams per liter parts of potassium hexafluorozirconate, 46 grams per liter of basic chromium sulfate and 0.0 to 1.5 grams per liter of potassium tetrafluoroborate.

4. Process for preparing passive coatings on bulk-aluminum alloys and aluminum-powder pigments having a micro size ranging from about 2.8 to 4.0 microns which comprises coating said aluminum alloys and powder-pigments with an acidic aqueous composition having a pH from about 2.8 to 4.0 at temperatures ranging from about 120° F. to 200° F.; said aqueous composition consisting essentially of about, in parts by weight per liter of water, 20 grams per liter of potassium hexafluorozirconate, 15 grams per liter of basic chromium sulfate and 1.0 grams per liter of potassium tetrafluoroborate.

* * * * *